(12) United States Patent
Duval et al.

(10) Patent No.: US 8,575,078 B2
(45) Date of Patent: Nov. 5, 2013

(54) COATING FOR ELASTOMERIC LINEAR PROFILES, IN PARTICULAR WINDSCREEN-WIPER BLADES, AND PROCESS FOR PRODUCTION THEREOF

(75) Inventors: Vincent Duval, Bruxelles-Schaerbeek (BE); Yves Verburgh, Puurs (BE); Valerie Carlier, Gesves (BE)

(73) Assignee: Robert Bosch GmbH, Stuttgart (DE)

( * ) Notice: Subject to any disclaimer, the term of this patent is extended or adjusted under 35 U.S.C. 154(b) by 401 days.

(21) Appl. No.: 12/919,581

(22) PCT Filed: Feb. 4, 2009

(86) PCT No.: PCT/EP2009/051267
§ 371 (c)(1),
(2), (4) Date: Aug. 26, 2010

(87) PCT Pub. No.: WO2009/121651
PCT Pub. Date: Oct. 8, 2009

(65) Prior Publication Data
US 2010/0325830 A1 Dec. 30, 2010

(30) Foreign Application Priority Data

Apr. 2, 2008 (DE) .......................... 10 2008 000 928

(51) Int. Cl.
*C10M 169/04* (2006.01)
*C10M 111/04* (2006.01)
*C01G 39/06* (2006.01)
*C07D 251/54* (2006.01)
*A47L 1/00* (2006.01)
*B05D 3/02* (2006.01)

(52) U.S. Cl.
USPC ........... 508/113; 508/155; 508/167; 508/181; 508/258; 508/591; 15/250.48; 427/372.2

(58) Field of Classification Search
USPC ......... 508/109, 113, 155, 181, 167, 591, 258; 15/250.48; 427/372.2
See application file for complete search history.

(56) References Cited

U.S. PATENT DOCUMENTS

| 6,077,592 A | 6/2000 | Azuma et al. |
| 6,696,391 B2 | 2/2004 | Goto et al. |
| 2001/0003608 A1* | 6/2001 | Mang et al. .................. 428/36.3 |
| 2003/0016204 A1 | 1/2003 | Lee |

FOREIGN PATENT DOCUMENTS

| EP | 0562191 | 9/1993 |
| EP | 1350813 | 10/2003 |
| JP | 57117597 | 7/1982 |
| JP | 9296136 | 11/1997 |
| JP | 2004010707 | 1/2004 |

OTHER PUBLICATIONS

PCT/EP2009/051267 International Search Report.

* cited by examiner

*Primary Examiner* — Cephia D Toomer
*Assistant Examiner* — Vishal Vasisth
(74) *Attorney, Agent, or Firm* — Michael Best & Friedrich LLP

(57) ABSTRACT

The present invention relates to a coating for elastomeric linear profiles, where the coating comprises solid lubricant embedded into a polymeric matrix. It also relates to a wiper blade for windscreen wipers, comprising this type of coating, and also to a process for the production of an elastomeric linear profile coated according to the invention. The polymeric matrix with embedded solid lubricant is obtained by polymerizing, in the absence of polymeric binders, a mixture comprising the solid lubricant and low-molecular-weight crosslinking agent. In one embodiment, the matrix is obtained from the thermal polymerization of the low-molecular-weight crosslinking agent hexamethoxymethylmelamine. Examples of solid lubricants are graphite and HDPE.

5 Claims, No Drawings

COATING FOR ELASTOMERIC LINEAR PROFILES, IN PARTICULAR WINDSCREEN-WIPER BLADES, AND PROCESS FOR PRODUCTION THEREOF

This application is a 371 of PCT/EP09/51267, filed Feb. 4, 2009.

BACKGROUND OF THE INVENTION

The present invention relates to a coating for elastomeric linear profiles, where the coating comprises solid lubricant embedded into a polymeric matrix. It further relates to a wiper blade for windshield wipers, comprising this coating, and also to a process for producing an elastomeric linear profile coated by the invention.

Wiper blades for windshield wipers can generally adapt to the shape of the windshield of the motor vehicle, and remain adequately flexible at various temperatures. Wiper blades are therefore generally produced from elastomer profiles and rubber materials, for example natural rubber or chloroprene. There can also be wiper blades manufactured from materials such as silicone rubber or polyurethane rubber.

Elastomers have higher coefficients of sliding friction than other materials such as glass or plastic. In the case of a wiper blade of a windshield wiper, the force that has to be exerted for a horizontal movement of the windshield wiper along the windshield is many times the pressure force exerted vertically through the contact of the windshield with the profile of the wiper blade. In order to reduce friction, the wiper blades can be provided with coatings which have a low coefficient of friction.

Wiper blades are often used on windshields which have been equipped with hydrophobic properties. The behavior of wiper blades on hydrophobic windshields is similar to the slip behavior on a dry surface. The water-repellent surface of the windshield prevents formation of any friction-reducing water film between the surface and the wiper blade. Any additional coating for wiper blades therefore has to comply with the requirements in relation to frictional properties, wear resistance, and smear-free wiping.

Conventional coatings for wiper blades include graphite or molybdenum disulfide as particulate solid lubricant, in order to reduce the coefficient of friction of the wiper blade on the windshield surface. The effectiveness of graphite as solid lubricant mostly depends on the relative concentration thereof in the coating.

A disadvantage of known coatings using particulate graphite as lubricant is that the softness and the required high relative proportion of the graphite particles reduces coherence within the coating. The coating is therefore subject to increased wear during service. The proportion of graphite in the coating is generally set higher than the critical pigment volume concentration, in order to achieve the low coefficient of friction demanded. Cohesion forces are thus reduced, and the coating becomes less robust.

The use of hard solid lubricants to increase wear resistance leads to poorer wiping quality caused by smearing and streaking. If the proportion of graphite is reduced, for example to below 30%, the result is that the surface of each graphite particle is mainly coated with the binder. This reduces the lubricant effect of the graphite and thus increases the coefficient of friction of the coating.

US 2003/0087767 A1 discloses a rubber wiper blade with a coating film on both surfaces of the lip portion, where the coating film comprises a particulate solid lubricant and a binder. After the drying or hardening process, the 0.5% modulus of the binder is 1 MPa or more and its elongation at break is 1% or more. The binders of said publication are in polymeric form from the outset here. For the coating process, they are dissolved in solvents and applied to a wiper blade. After any preceding crosslinking process by means of curing agents, the solvent is removed and the finished coating is formed. However, said specification does not give any detail of the abrasion resistance of the coating and therefore the lifetime of the wiper blade. When predominantly organic solvents have to be used for applying the binder and the solid lubricant to the wiper blade, this is economically disadvantageous. Predominant use of organic solvents is moreover undesirable for environmental reasons.

SUMMARY OF THE INVENTION

The invention proposes a coating for elastomeric linear profiles, where the coating comprises solid lubricant embedded into a polymeric matrix, and where the polymeric matrix can be obtained with embedded solid lubricant by polymerizing, in the absence of polymeric binders, a mixture comprising the solid lubricant and low-molecular-weight crosslinking agent.

The term polymeric binders is used here for binders of which the molar mass of the molecules is ≥1000 g/mol. The absence of those polymeric binders means that they are not present or that only an amount that is technically unavoidable is present. By way of example, the content thereof can be ≤0.1% by weight or ≤0.01% by weight.

For the purposes of the present invention, low-molecular-weight crosslinking agents are at least bifunctional monomeric or oligomeric compounds. The molar mass thereof is ≤1000 g/mol, preferably ≤500 g/mol. The crosslinking agent molecules can use reactive groups to form bonds with one another. The reactive groups can also be present in capped form, so that heating is required before they are liberated and reaction occurs. The polymerization of the crosslinking agents can proceed by way of example thermally or via free radicals, or can be induced by radiation. The term polymerization includes polycondensation reactions and polyaddition reactions. Once the polymerization process has ended, a polymeric matrix is present, within which the solid lubricant has been embedded. The solid lubricant is preferably in particulate form. The average particle size can therefore be from ≥0.1 µm to ≤15 µm.

The invention has found that omission of any polymeric binder in the composition of the matrix and, instead of this, polymerization of a crosslinking agent per se can resolve the intrinsic contradiction between the requirements of high contents of soft solid lubricant and the abrasion-resistant matrix. Even if the ratio by volume of solid lubricant to matrix is high, there are sufficient cohesion forces prevailing within the matrix to provide binding of solid lubricants. At the same time, the strength of the matrix is sufficient to improve abrasion resistance. The omission of any polymeric binder allows simplification of the production process, since the number of component feeds is reduced by one.

In one embodiment of the coating, the material of the solid lubricant has been selected from the group consisting of graphite, molybdenum disulfide, hexagonal boron nitride, glass microbeads, polytetrafluoroethylene, polyethylene, and/or polypropylene. Particular preference is given here to macrocrystalline natural graphite, the flake-like structure of which provides particularly low coefficients of friction. Preference is likewise given to a combination of macrocrystalline natural graphite and high-density polyethylene (HDPE).

In another embodiment of the coating, the low-molecular-weight crosslinking agent has been selected from the group consisting of fully alkoxylated melamine derivatives, partially alkoxylated melamine derivatives, and/or hexamethoxymethylmelamine. Particular preference is given here to hexamethoxymethylmelamine. The abovementioned crosslinking agents can be polymerized even without binder, to give a matrix under process conditions that are easy to realize. The resultant matrix has the required cohesion in relation to the solid lubricants and simultaneously has the hardness needed for wear resistance. Another advantage of said crosslinking agents is that, if appropriate in combination with a cosolvent, they are also water-soluble.

In another embodiment of the coating, within the polymeric matrix, the phase-volume ratio of solid lubricant to polymerized crosslinking agent is in a range from ≥0.3 to ≤9.0. The ratio can also be in a range from ≥0.4 to ≤3.0, or from ≥1.0 to ≤1.5. Particularly good lubricant properties are achieved with these ratios by volume, with simultaneous wear resistance.

The present invention further provides a wiper blade for windshield wipers, comprising a coating of the present invention. The main material of the wiper blade can by way of example be rubber, chloroprene, silicone rubber, elastomeric polyurethane, or any other elastomer. The film thickness present of the coating of the invention, after the drying and hardening process, can advantageously be from ≥1 μm to ≤10 μm, from ≥2 μm to ≤8 μm, or from ≥4 μm to ≤6 μm.

In one embodiment of the wiper blade for windshield wipers, a further layer has been arranged on the polymerized coating and/or on an uncoated surface and comprises solid lubricant. In said layer, the solid lubricant has not been embedded into a crosslinked polymeric matrix. Because the solid lubricant has not been fixed, it can become distributed more rapidly and more uniformly over the coated and initially uncoated surface. These wiper blades can be obtained by first providing a double profile of the wiper blade with the crosslinked coating of the invention and then separating the profile into two individual profiles. The cut surface here is the surface which is in contact with the windshield when the windshield wiper is in service. The constitution of the dried further layer can by way of example be from ≥4% by weight to ≤15% by weight of uncrosslinked binder, from ≥0.5% by weight to ≤4% by weight of thickener, from ≥1.0% by weight to ≤11% by weight of surfactant, and from ≥80% by weight to ≤90% by weight of graphite.

The present invention further relates to a process for producing a coated elastomeric linear profile, where the profile is provided with a coating as claimed in any of claims 1 to 4, comprising the steps of:
a) applying a mixture comprising solid lubricant and low-molecular-weight crosslinking agent to the profile
b) heating to a temperature of from ≥100° C. to ≤200° C.

In step a), the elastomer profile is coated. This can be achieved inter alia via dip-coating or application of a spray. The proportion of the solid lubricant in the mixture to be applied can by way of example be from ≥5% by weight to ≤25% by weight, or from ≥9% by weight to ≤21% by weight. By way of example, the proportion of the low-molecular-weight polymerizable crosslinking agent can be from ≥5% by weight to ≤15% by weight, or from ≥7% by weight to ≤10% by weight.

In step b), the low-molecular-weight polymerizable crosslinking agent is thermally polymerized. This forms the polymeric matrix which embeds the solid lubricant particles. The thermal polymerization process can be carried out for from ≥3 minutes to ≤25 minutes, or for from ≥10 minutes to ≤15 minutes. Said heating process can also take place at a temperature of from ≥140° C. to ≤160° C. It is also possible to insert a drying step upstream of the thermal polymerization process, in order to remove the solvent from the coating mixture.

In one embodiment of the process, in the mixture of step a), the material of the solid lubricant has been selected from the group consisting of graphite, molybdenum disulfide, hexagonal boron nitride, glass microbeads, polytetrafluoroethylene, polyethylene, and/or polypropylene. In the mixture of step a), the low-molecular-weight crosslinking agent has moreover been selected from the group consisting of fully alkoxylated melamine derivatives, partially alkoxylated melamine derivatives, and/or hexamethoxymethylmelamine. The advantages of selection of said materials have been explained above.

In another embodiment of the process, the mixture of step a) moreover comprises polyacrylate thickener, butyl glycol, and water. Water is the preferred main solvent, for reasons of pollution prevention and process reliability, and also for reasons of cost. The proportion of the water in the coating mixture can by way of example be from ≥50% by weight to ≤90% by weight, or from ≥60% by weight to ≤80% by weight. Butyl glycol serves as cosolvent making it possible to retain the low-molecular-weight crosslinking agent, such as hexamethoxymethylmelamine in particular, in solution. The proportion of butyl glycol in the coating mixture can by way of example be from ≥10% by weight to ≤20% by weight, or from ≥14% by weight to ≤16% by weight. The polyacrylate thickener serves to adjust the viscosity of the coating mixture so that a continuous coating can be formed even on nonpolar substrate surfaces. The increased viscosity moreover maintains better dispersion of the graphite particles. The proportion of the thickener in the coating mixture can by way of example be from ≥1% by weight to ≤5% by weight, or from ≥2% by weight to ≤3% by weight.

In another embodiment of the process, after the heating process in step b), a mixture which comprises solid lubricant is applied on the polymerized coating and/or on an uncoated surface. The coated profile is moreover dried at a temperature of from ≥50° C. to ≤100° C. By way of example, this can be achieved after a previously coated double profile has been separated to give two individual profiles. The cut surface is then the uncoated surface. The temperature is selected in such a way as to prevent crosslinking of any binder but merely to expel the solvent from the mixture. Another suitable temperature range is from ≥80° C. to ≤90° C. Because the solid lubricant has not been fixed, it can become distributed more rapidly and more uniformly across the polymerized coating and across the initially uncoated cut surface.

DETAILED DESCRIPTION

The examples below provide further explanation of the present invention.

EXAMPLE 1

An aqueous coating composition comprising a methylated iminomelamine aminoplastic, a graphite lubricant filler, and a thickener was applied to an elastomer substrate. The formulation of the coating composition was as follows:

|  | Proportion by weight |
| --- | --- |
| Cymel 303 | 10.0 |
| Graphite | 9.0 |
| Polyacrylate thickener | 3.0 |
| Butyl glycol | 14.0 |
| Deionized water | 64.0 |
| Total: | 100.0 |

Cymel 303 is a trade name of Cytec for hexamethoxymethylmelamine.

In this example, the elastomer substrate was a double profile for a wiper blade, obtained by injection molding from a chlorinated rubber mixture. After incipient drying for removal of the solvents, the double profiles were hardened at 150° C. for 10 minutes. A film of thickness 4 µm was obtained, having the following constitution of the graphite component and polymer matrix component:

|  | % by weight | % by volume |
|---|---|---|
| Solid fraction of polymerized Cymel 303 | 51.5 | 67.4 |
| Solid fraction of graphite | 47.3 | 31.0 |
| Thickener | 1.2 | 1.6 |
| Total: | 100.0 | 100.0 |

After the hardening process, the double profiles were separated to give two individual profiles. A study of the cut surfaces revealed no damage or flaking of the coating away from the cut surface.

The phase-volume ratio of graphite to polymerized crosslinking agent here was 0.46. This gave the coating good slide properties. The polymer matrix provided strong bonding between the graphite particles, giving good abrasion resistance on both hydrophobic and hydrophilic windshield surfaces.

EXAMPLE 2

An aqueous coating composition comprising a methylated iminomelamine aminoplastic, a graphite lubricant filler, and a thickener was applied to an elastomer substrate. The formulation of the coating composition was as follows:

|  | Proportion by weight |
|---|---|
| Cymel 303 | 10.0 |
| Graphite | 21.0 |
| Polyacrylate thickener | 3.0 |
| Butyl glycol | 14.0 |
| Deionized water | 52.0 |
| Total: | 100.0 |

In this example, the elastomer substrate was a double profile for a wiper blade, obtained by injection molding from a chlorinated rubber mixture. After incipient drying for removal of the solvents, the double profiles were hardened at 150° C. for 10 minutes. A film of thickness 4 µm was obtained, having the following constitution of the graphite component and polymer matrix component:

|  | % by weight | % by volume |
|---|---|---|
| Solid fraction of polymerized Cymel 303 | 31.6 | 47.7 |
| Solid fraction of graphite | 67.7 | 51.2 |
| Thickener | 0.7 | 1.1 |
| Total: | 100.0 | 100.0 |

After the hardening process, the double profiles were separated to give two individual profiles. A study of the cut surfaces revealed no damage or flaking of the coating away from the cut surface.

The phase-volume ratio of graphite to polymerized crosslinking agent here was increased to 1.08. This gave the coating good slide properties. The polymer matrix still provided strong bonding between the graphite particles, giving good abrasion resistance on both hydrophobic and hydrophilic windshield surfaces.

EXAMPLE 3

An aqueous coating composition comprising a methylated iminomelamine aminoplastic, a graphite lubricant filler, a polyethylene dispersion and a thickener was applied to an elastomer substrate. The formulation of the coating composition was as follows:

|  | Proportion by weight |
|---|---|
| Cymel 303 | 10.0 |
| Graphite | 9.0 |
| HDPE dispersion | 8.8 |
| Polyacrylate thickener | 3.0 |
| Butyl glycol | 15.8 |
| Deionized water | 72.4 |
| Total: | 119.0 |

The solids content of the dispersion of high-density polyethylene (HDPE) was 35%.

In this example, the elastomer substrate was a double profile for a wiper blade, obtained by injection molding from a chlorinated rubber mixture. After incipient drying for removal of the solvents, the double profiles were hardened at 150° C. for 10 minutes. A film of thickness 4 µm was obtained, having the following constitution of the lubricant component and polymer matrix component:

|  | % by weight | % by volume |
|---|---|---|
| Solid fraction of polymerized Cymel 303 | 44.3 | 55.6 |
| Solid fraction of graphite | 40.7 | 25.5 |
| Solid fraction of HDPE | 14.0 | 17.6 |
| Thickener | 1.0 | 1.3 |
| Total: | 100.0 | 100.0 |

After the hardening process, the double profiles were separated to give two individual profiles. A study of the cut surfaces revealed no damage or flaking of the coating away from the cut surface.

The phase-volume ratio of lubricant (graphite and HDPE) to polymerized crosslinking agent here was 0.78. This gave the coating good slide properties. The polymer matrix provided strong bonding between the graphite particles, giving good abrasion resistance on both hydrophobic and hydrophilic windshield surfaces.

EXAMPLE 4

An aqueous coating composition comprising a methylated iminomelamine aminoplastic, a graphite lubricant filler, a polyethylene dispersion and a thickener was applied to an elastomer substrate. The formulation of the coating composition was as follows:

|  | Proportion by weight |
|---|---|
| Cymel 303 | 7.0 |
| Graphite | 9.0 |
| HDPE dispersion | 8.8 |

-continued

|  | Proportion by weight |
|---|---|
| Polyacrylate thickener | 2.5 |
| Butyl glycol | 15.8 |
| Deionized water | 56.9 |
| Total: | 100.0 |

The solids content of the dispersion of high-density polyethylene (HDPE) was 35%.

In this example, the elastomer substrate was a double profile for a wiper blade, obtained by injection molding from a chlorinated rubber mixture. After incipient drying for removal of the solvents, the double profiles were hardened at 150° C. for 10 minutes. A film of thickness 4 μm was obtained, having the following constitution of the lubricant component and polymer matrix component:

|  | % by weight | % by volume |
|---|---|---|
| Solid fraction of polymerized Cymel 303 | 35.9 | 46.9 |
| Solid fraction of graphite | 47.0 | 30.8 |
| Solid fraction of HDPE | 16.1 | 21.0 |
| Thickener | 1.0 | 1.3 |
| Total: | 100.0 | 100.0 |

After the hardening process, the double profiles were separated to give two individual profiles. A study of the cut surfaces revealed no damage or flaking of the coating away from the cut surface.

The phase-volume ratio of lubricant (graphite and HDPE) to polymerized crosslinking agent here was increased to 1.10. This gave the coating good slide properties. The polymer matrix still provided strong bonding between the graphite particles, giving good abrasion resistance on both hydrophobic and hydrophilic windshield surfaces.

EXAMPLE 5

A coating as in Example 1 was applied and hardened. After the double profiles had been cut and separated to give individual profiles, a graphite dispersion was sprayed onto the individual profiles. The polymerized coating initially applied, comprising graphite, now acted as base layer. The graphite dispersion was dried at 90° C. in order to remove the aqueous solvent. An uncrosslinked outer layer was obtained, which covered not only the base layer but also the cut surface of the individual profiles. The dried outer layer comprised 4.6% by weight of polymer binder, 3.4% by weight of thickener, 10.2% by weight of surfactant, and 81.8% by weight of graphite.

These double-coated wiper blades were tested for 30 minutes on a hydrophobic automobile windshield. Water was sprayed onto the windshield to simulate rain. The recorded chatter amplitudes remained at a consistently low level during the test: less than 8 mm. The movement of the wiper blades across the windshield was smooth and silent. Wiping quality remained excellent.

What is claimed is:

1. A wiper blade for windshield wipers, comprising an elastomeric linear profile having a coating, where the coating comprises solid lubricant embedded into a polymeric matrix, characterized in that the polymeric matrix is obtained with embedded solid lubricant by polymerizing, in the absence of polymeric binders, a mixture comprising the solid lubricant and low-molecular-weight crosslinking agent, where the low-molecular-weight crosslinking agent has been selected from the group consisting of fully alkoxylated melamine derivatives, partially alkoxylated melamine derivatives, and/or hexamethoxymethylmelamine.

2. The wiper blade as claimed in claim 1, where the material of the solid lubricant has been selected from the group consisting of graphite, molybdenum disulfide, hexagonal boron nitride, glass microbeads, polytetrafluoroethylene, polyethylene, and/or polypropylene.

3. The wiper blade as claimed in claim 1, where, within the polymeric matrix, the phase-volume ratio of solid lubricant to polymerized crosslinking agent is in a range from ≥0.3 to ≤9.0.

4. The wiper blade for windshield wipers as claimed in claim 1, where a further layer has been arranged on the polymerized coating and/or on an uncoated surface and comprises solid lubricant, and where, in said layer, the solid lubricant has not been embedded into a crosslinked polymeric matrix.

5. The wiper blade as claimed in claim 2, where the low-molecular-weight crosslinking agent has been selected from the group consisting of fully alkoxylated melamine derivatives, partially alkoxylated melamine derivatives, and/or hexamethoxymethylmelamine.

* * * * *